United States Patent [19]

Schatteman

[11] 4,173,320

[45] Nov. 6, 1979

[54] DIRECT DRIVE FOR FAST FORWARD AND REVERSE IN TAPE DECK

[75] Inventor: Etienne A. M. Schatteman, Wemmel, Belgium

[73] Assignee: Staar, S.A., Brussels, Belgium

[21] Appl. No.: 949,524

[22] Filed: Oct. 10, 1978

[51] Int. Cl.² ............................................. G03B 1/04
[52] U.S. Cl. ................... 242/206; 242/67.4; 242/201
[58] Field of Search ........ 242/200, 201, 206, 208–210, 242/189, 67.5, 67.4; 74/797, 798; 192/20; 197/160–164; 40/30, 31, 87–95

[56] References Cited

U.S. PATENT DOCUMENTS

| | | | |
|---|---|---|---|
| 3,529,787 | 9/1970 | Bowman et al. | 242/189 |
| 4,046,334 | 9/1977 | Kato et al. | 242/201 |
| 4,079,828 | 3/1978 | Babler | 197/160 |
| 4,102,517 | 7/1978 | Cicatelli | 242/201 |

Primary Examiner—Leonard D. Christian

Attorney, Agent, or Firm—Leydig, Voit, Osann, Mayer & Holt, Ltd.

[57] ABSTRACT

A tape transport is disclosed having a capstan drive, a reel drive for a take-up spindle for the take-up reel, a slipping clutch in said reel drive, and a selectively engageable direct drive connection between the clutch plates of the clutch to provide a non-slipping connection in the reel drive for use in fast drive modes, the direct drive including gear teeth on both clutch plates forming gears, and a short circuit gear engageable with the gears on both clutch plates. Also included are supports and operating mechanism by which the capstan drive and direct drive are engaged and disengaged in sequence; said capstan drive being disengaged before said direct non-slipping connection in said reel drive is engaged, and said direct non-slipping connection in said reel drive being disengaged before said capstan drive is engaged, to prevent direct reel drive of the tape without disengagement of the capstan drive, and avoid tape breakage or mechanism jamming.

4 Claims, 8 Drawing Figures

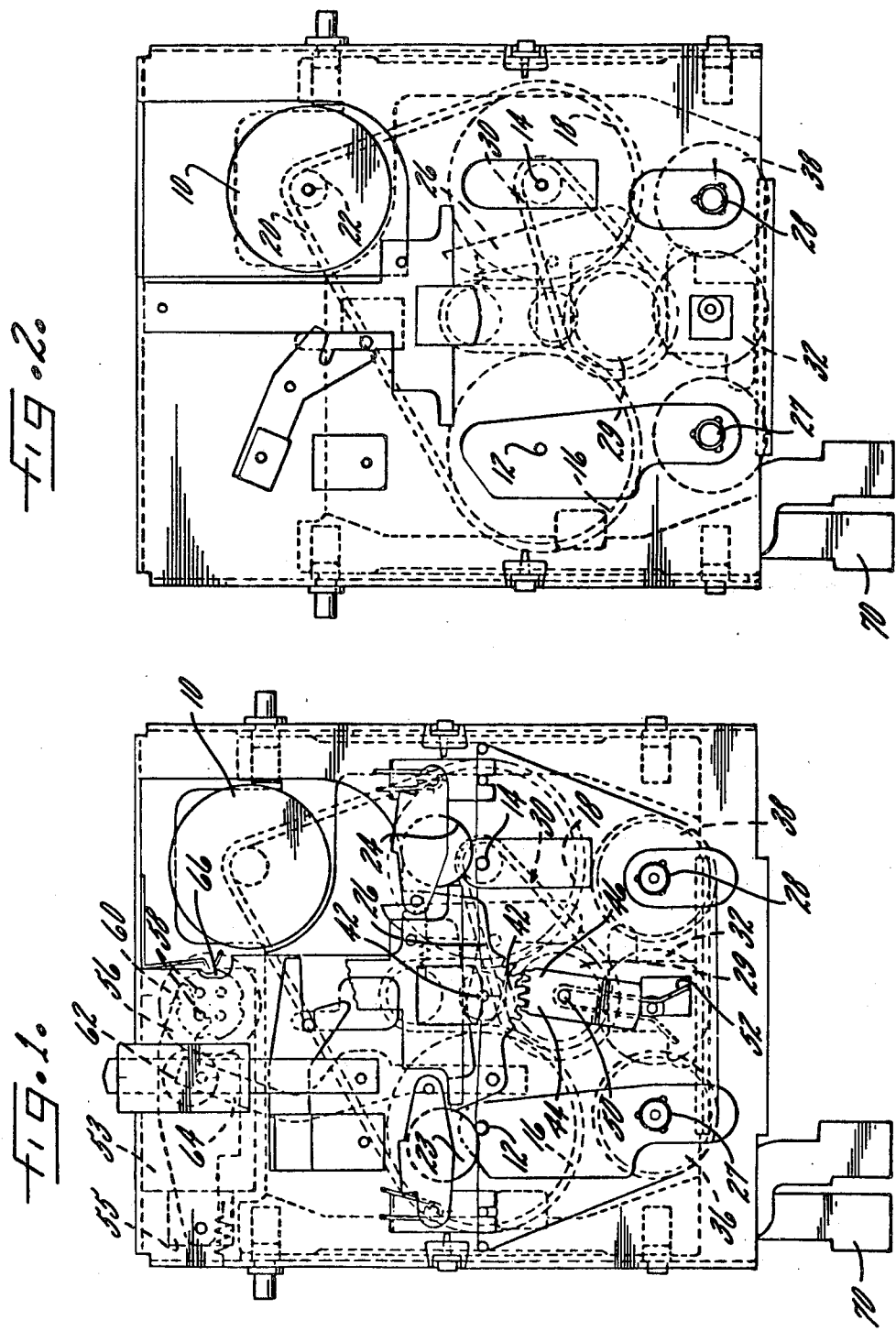

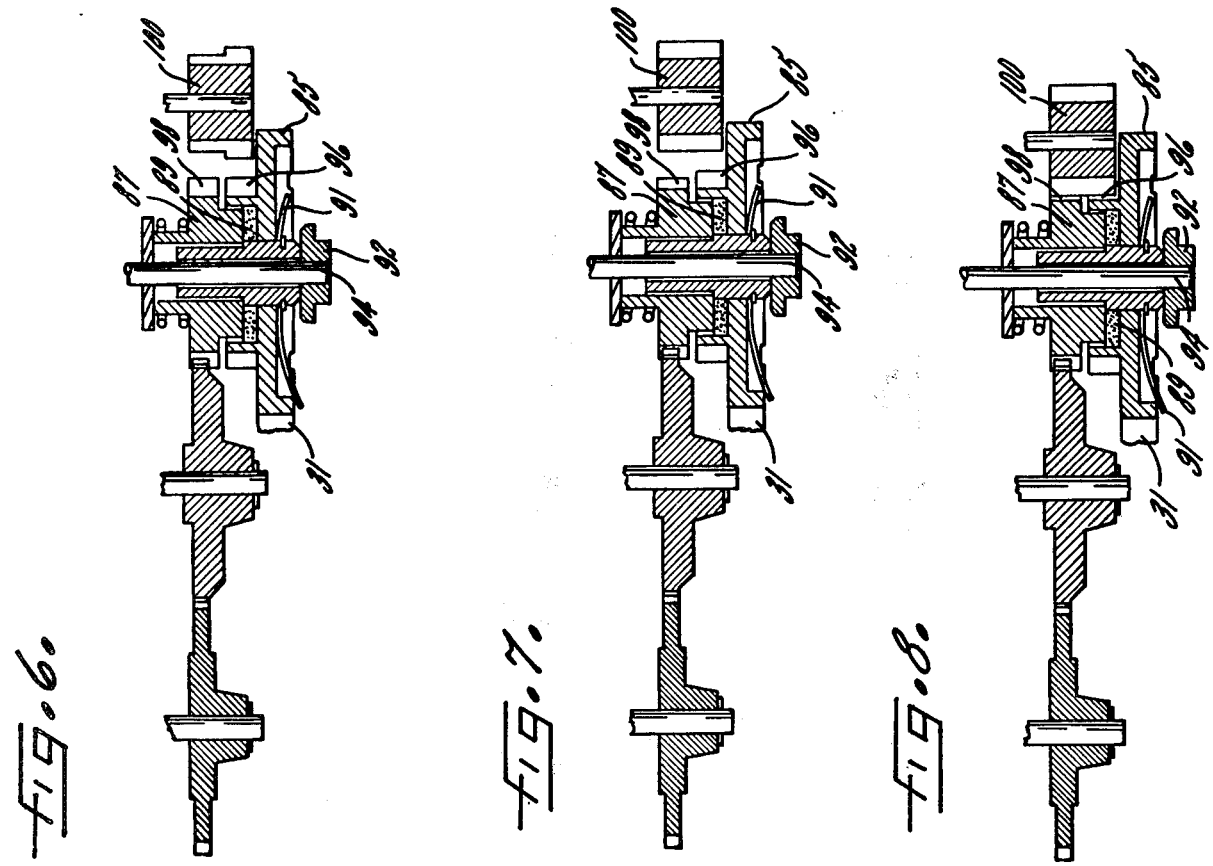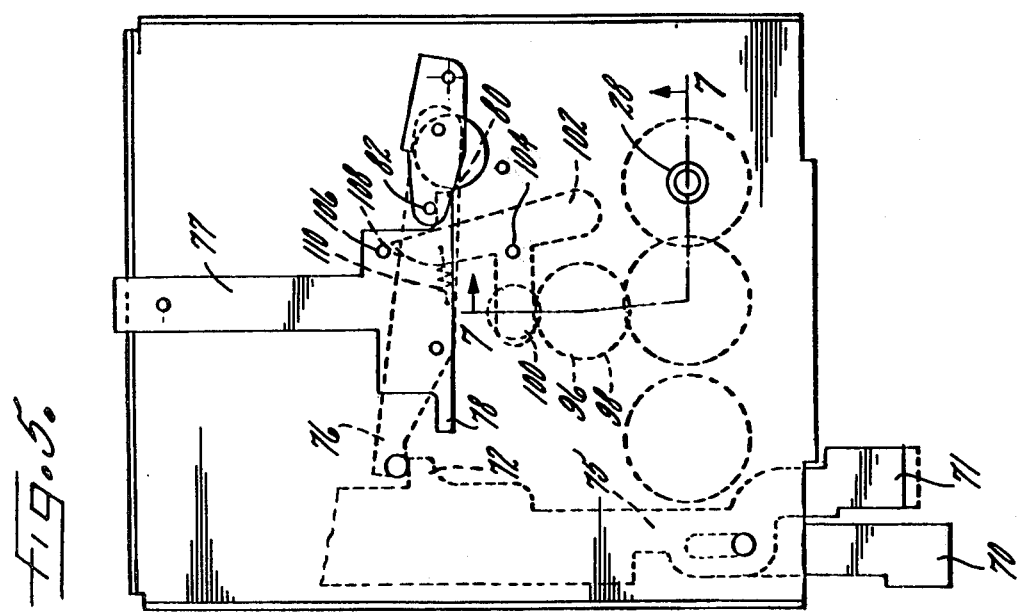

DIRECT DRIVE FOR FAST FORWARD AND REVERSE IN TAPE DECK

The present invention relates to magnetic tape recording and playback apparatus, and more particularly to tape transports for recording and playback apparatus for tape cassettes, providing movement of the tape from reel to reel within the cassette at normal speed for recording or playback by a capstan drive, and movement of the tape at fast speed by a reel drive with the capstan drive disengaged.

In tape transports of this type, a drive train is provided to reel drive spindles which engage in the hubs of the reels of the cassette to drive the reels. In the drive train to the reel spindles it is conventional to include a clutch which accomodates the varying angular speed of the take-up reel because of varying amounts of tape wound on the reel in the course of transfer of tape from one reel to the other. The clutch connection is provided so that a constant torque is available at the take-up reel spindle to accomodate the changing speed of the take-up spindle. Normally, the input end of the clutch is driven at a faster speed than that of the reel spindle, the speed difference being taken up by the clutch connection, in order to provide constant torque at the take-up reel spindle.

When the tape is driven at fast speed, however, it is undesirable to lose torque through a slipping clutch between the drive motor and the take-up reel. It has been known, as illustrated in Bowman U.S. Pat. No. 3,529,787, to provide means for locking the clutch so that it does not slip when the tape transport is placed into a fast wind mode. The mechanism illustrated in Bowman U.S. Pat. No. 3,529,787 utilizes a cam operated pawl to provide the locking connection between the clutch components, which introduces a variable delay that prevents an exactly timed disengagement of the fast speed drive in relation to engagement and disengagement of the capstan drive.

It is highly desirable in operating a tape transport to engage and disengage the reel drives and capstan drives in a sequence that insures the fast speed reel drive is initiated after the capstan drive has been disengaged, and the normal speed capstan drive is engaged after the fast speed reel drive has been disengaged, to avoid breaking the tape or jamming the mechanism.

One of the principal objects of this invention is to provide in a tape transport having a clutch in the reel drives, a system for directly connecting the components of the clutch during fast speed operation that is operable in predetermined and coordinated sequence with the engagement and disengagement of the capstan drive and the reel drive of such a tape transport to avoid breaking the tape or jamming the mechanism.

A related object is to provide a simple mechanical system for directly connecting or "short circuiting" the normally slipping clutch components of a clutch especially suited for a tape transport reel drive.

Other objects will become apparent from the following description in connection with the accompanying drawings wherein:

FIG. 1 is a plan view of a tape transport incorporating a preferred embodiment of the present invention and illustrates the tape transport with the capstan drive engaged to drive the tape from reel to reel of the cassette.

FIG. 2 is a plan view of the mechanism illustrated in FIG. 1 with the capstan drive disengaged.

FIG. 5 is a plan view similar to FIGS. 3 and 4, with the fast forward pushbutton fully actuated resulting in the short circuit means for the clutch plates being engaged to provide a non-slipping connection between the normally slipping clutch components in accordance with the present invention;

FIG. 6 is a sectional view taken in the planes illustrated by the lines 6—6 in FIG. 4 and illustrates the gear train including the clutch to the take-up reel spindle and the short circuit means for the clutch, constructed in accordance with the preferred embodiment of the invention;

FIG. 7, is a sectional view similar to FIG. 6, illustrating an alternative construction for the short circuit means for the clutch;

FIG. 8 is a cross sectional view, similar to FIG. 7, illustrating the short circuit gear means shown in FIG. 7 engaged with the teeth on the driving and driven clutch plates of the clutch to provide a direct non-slipping connection.

Figure 3:
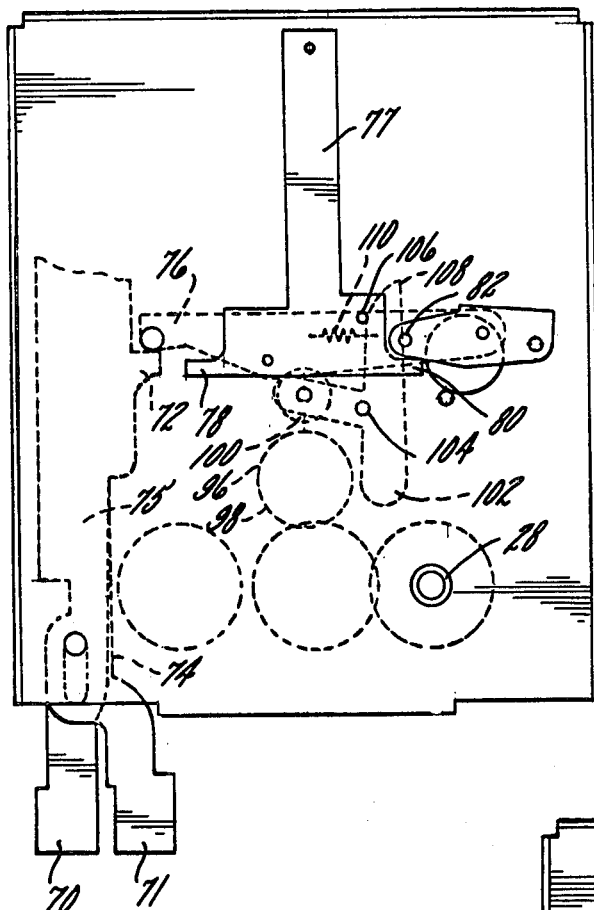
FIG. 3 is a plan view of the mechanism shown in FIG. 1, with components removed and others shown fragmentarily, and illustrating the capstan drive engaged to drive the tape in the reverse direction as compared with the direction provided by the capstan drive in FIG. 1.

The invention is embodied, for purposes of explanation, in a bidirectional tape transport for tape cassettes illustrated in FIG. 1 which provides both a capstan drive for moving the tape at normal playback or recording speed and a reel drive for moving the tape at fast speed. To obtain normal speed and fast speed in either direction from the same tape transport drive motor 10, it is supplied from voltage and speed regulating circuit means (not shown) with electrical power at controlled voltage levels and reversible polarities. Power is supplied to the motor at a lower voltage level for driving the tape at normal playback or recording speeds, and at a higher voltage level to operate the motor at a faster speed for fast forward and fast rewind of the tape. For details of the bidirectional tape transport including a suitable circuit means connected to the motor, reference is made to copending application Ser. No. 906,311 of E. A. Schatteman entitled "Fast Rewind Mechanism For Bidirectional Tape Transports For Cassettes", filed May 16, 1978. However, while such a circuit means and power supply arrangement is preferred, it will be understood that a change speed and reversing mechanism may be employed in place of a controlled voltage level and polarity supply for shifting the drive direction and speed from normal playing speed to higher speed for fast forward and rewind functions.

As shown in FIG. 1, the bidirectional capstan drive is provided by a pair of capstans 12, 14 which are carried on flywheels 16, 18 driven in the same direction by a continuous belt 20 from a pulley 22 on the shaft of the motor 10. With the tape transport components in the position shown in FIG. 1, the motor 10 is rotating the flywheels and capstans counterclockwise.

The capstan drive also includes a pair of pressure or pinch rollers 23, 24 supported on pivotal mountings. With the capstan drive engaged as shown in FIG. 1, the lefthand pressure roller 23 is engaged with the capstan 12 causing movement of the tape from right to left in that figure. The alternate pressure roller 24 is disengaged from the alternate capstan 14 by the lever 26 which releases the engaged pressure roller to the action of its spring. By reversing the direction of rotation of the motor 10 as by reversing polarity of the supply voltage, and rocking the lever 26 to engage the alternate pinch roller 24 with the alternate capstan 14, the capstan 14 is driven clockwise and drives the tape from left to right as shown in FIG. 3.

The bidirectional drive also includes a reel drive coupled to the take-up reel to which the tape is delivered by the capstan drive. The bidirectional tape transport includes two reel spindles 27, 28 and drive means for both spindles. Since both capstans 12, 14 rotate in the same direction, when the direction of tape movement is reversed by reversing the drive motor 10, the drive means for the reel spindles is shifted so that the take-off reel becomes the driven take-up reel.

The drive means for the reel spindles 27, 28 includes a drive gear 29 connected by a pulley system 30 and belt 31 to one of the flywheels 18, and an intermediate shiftable gear 32 which is driven by the drive gear 29. With the motor 10 and the flywheels 16, 18 rotating in the counterclockwise direction, and the tape movement from right to left, as shown in FIG. 1, the lefthand reel spindle 27 serves as the take-up reel spindle and is driven through the intermediate gear 32 which is shown in FIG. 1 engaged with a gear 36 for the lefthand reel spindle 27. To shift the drive from one reel spindle to the other, the intermediate gear 32 is movably mounted on the frame of the apparatus to shift from engagement with the gear 36 operating the lefthand reel spindle 27 to a position of engagement with the gear 38 operating the righthand reel spindle 28, as shown in FIG. 3. The shifting of the intermediate gear 32 from drive engagement with one or the other of the reel spindles gears 36 or 38 is carried out by movement of the same lever 26 which, in rocking about a supporting shaft 40, alternately engages and disengages the capstan drives by pivoting the pinch rollers 23, 24 into or out of engagement with the capstans 12, 14. To transmit the rocking motion of the lever 26 to the intermediate gear 32, the lever 26 bears a gear segment 42 which meshes with a gear segment 44 on an arm 46 pivoted on the frame about an axis 50. The arm 46 also carries a fork 52 which engages the shaft of the intermediate gear 32 and moves the gear from engagement with one of the reel spindle gears 36 or 38 to the other. The rocking movement of the lever 26 is utilized, therefore, to engage both the capstan drive and take-up spindle drive for one direction of tape movement at normal playback or recording speed while disengaging the other capstan drive and reel drive to the other reel spindle.

For rocking the lever 26 from one position to the other, the tape transport provides a solenoid 53 and means for transmitting the movement to the lever 26 as the solenoid plunger 55 pulls in, herein shown as a pawl and crank mechanism.

As set forth in detail in said copending application U.S. Ser. No. 906,311, the pull in stroke of the solenoid plunger 55 from left to right drives a pawl 56 from left to right which acts on one of four pins 58 carried by a gear 60. One forward stroke of the plunger 55 of the solenoid 53 rotates the gear 60 clockwise for a quadrant and the pawl 56 returns, lifts and drops back to its position behind the upper left most pin 58 as illustrated in FIG. 1 ready for the next stroke of the solenoid to rotate the gear 60 its quarter turn. Rotation of the gear 60 through one quadrant rotates a crank gear 62 180°, which rotates a crankpin 180° and moves the connecting rod 64 to the lever 26 a distance to rock the lever 26 from one of its extreme positions, shown for example in FIGS. 1, in a clockwise direction about 20°, to the other of its extreme positions. In its transition from the position of FIG. 1 to its other extreme position, the lever 26 not only shifts the intermediate gear 32 into mesh with the gear 38 for the reel spindle 28 but also disengages the left hand pinch roller 23 from its capstan 12, and allows the right hand pinch roller 24 under the urging of its spring to engage its capstan 14. A disc 66 with four recesses in its edge is fixed to turn with the pawl driven gear 60 and a detent on the main frame engages in the recesses to hold the disc 66 and gear 60 against movement between operations of the pawl.

The reversal of the polarity of the supply voltage to the motor 10 is insured by a slide switch 68 which is driven by the connecting rod 64. Each time the solenoid 53 is operated, the crank gear 62 moves the connecting rod 64 and thus the slider of the switch 68 from one position to the other to reverse the direction of rotation of the motor and reverse the direction of movement of the tape through the bidirectional tape transport, which involves shifting the direct drive from one reel spindle to the other so that the take-up spindle in the new direction of tape movement is operated by the drive motor through the direct drive means including the intermediate gear 32.

To energize the solenoid 53 and reverse the bidirectional drive, means are provided (not shown, but described in detail in copending application Ser. No. 906,311) in response to actuation of a reverse pushbutton to complete a circuit from the power source through the winding of the solenoid 53 to pull in its plunger 55. The operation of the reverse pushbutton also operates the pawl 56 and crank mechanism to shift the bidirectional drive and to invert the polarity of the voltage supplied to the motor 10 so that the capstan drive is engaged to move the tape in the new direction at normal speed, and the take-up reel spindle related to the new direction of tape movement is directly driven and the take-off spindle left relatively free to rotate.

The tape playback and recording apparatus shown in FIGS. 1–5 in addition to providing means for reversing the direction of tape movement at normal speed, also provides selectively operable means for reversing the direction of tape movement and moving the tape at high speed to achieve a fast rewind function. As herein shown, referring again to FIG. 1, operation of a fast rewind pushbutton 70 first energizes the solenoid 53 by completing a circuit through the solenoid winding from the voltage source. The slide switch 68 is shifted from one position to the other by the operation of the solenoid 53, reversing the bidirectional drive and the polarity of the voltage applied to the motor 10 thus reversing its direction of operation.

The solenoid 53 operates to reverse the bidirectional drive and disengage the engaged capstan drive by lifting the active pinch roller from its capstan. Thus, if the tape transport mechanism was in the position of FIG. 1 when the fast rewind pushbutton was actuated, the solenoid 53 is operated. This results in the position of the slide switch 68 and bidirectional drive to be changed by the pulling in of the solenoid plunger 55, and the bidirectional drive components being shifted from the position of FIG. 1 to the position of FIG. 3.

In the course of travel of the rewind pushbutton 70, a change speed switch which is in the circuit between the voltage and speed regulating circuit and the slide switch 68 is actuated. When the fast rewind pushbutton is pushed fully in, the full supply voltage is connected to the terminals of the motor 10. The holding of the fast rewind button fully pressed in maintains the high speed movement of the motor and the rewind movement of the tape. When the fast rewind pushbutton is released, the solenoid 53 is again energized. This pulls in the solenoid plunger 55, returning the slide switch 68 to its original position, and via the pawl 56 and crank mechanism again shifts the bidirectional drive to reverse the direction of movement of the drive motor 10 and the tape. Thus, the tape is moved at the normal speed and in the original direction which prevailed before the user operated the fast rewind drive mechanism.

Figure 4:
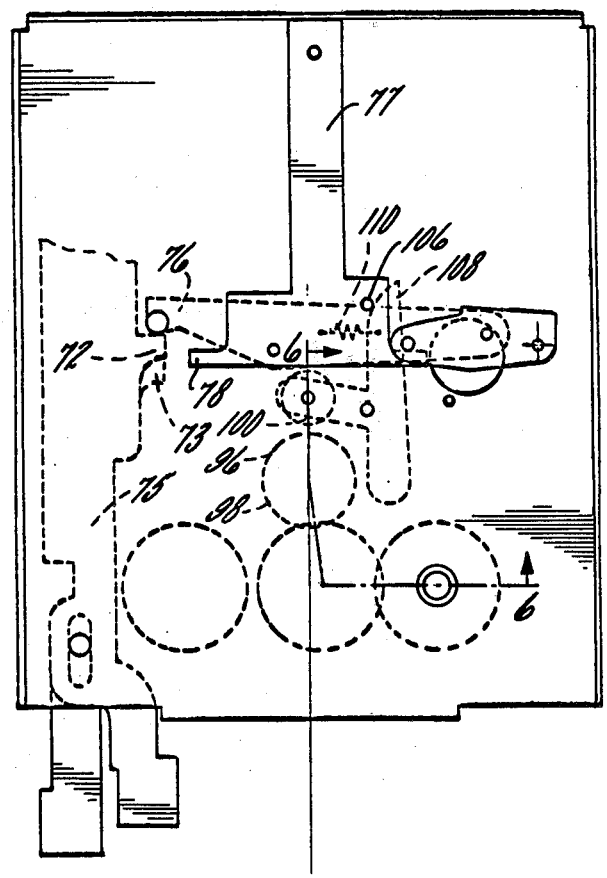
FIG. 4 is a plan view similar to FIG. 3, with the fast forward pushbutton after initial actuation, resulting in the capstan drive being disengaged.

The fast rewind pushbutton 70 is also operative in the course of its inward movement, and the fast forward pushbutton 71 is similarly operative in the course of its inward movement, to fully disengage the capstan drive from the tape and shift the recording and playback head on the main frame in a direction away from the tape, so that the tape of the cassette is freed for movement at high speed without interference or frictional engagement with those parts of the tape transport. For this purpose, as shown in FIGS. 3-5, lugs 72, 73 on the edges, respectively, of the pushbutton slide bar 74 and fast rewind pushbutton slide bar 75 engage a lever 76 which is pivotally mounted on the main frame and is pinned to a T-bar 77 slidably mounted on the main frame. The T-bar 77 has a pair of laterally projecting lugs 78, 80 which are operative to raise the pinch rollers 23, 24 away from the capstans 12, 14. The inward movement of either pushbutton 71 or 72 lifts the lever 76 from the position of FIG. 4 to the position shown in FIG. 5, and in the course of that movement slides the T-bar 77 in a direction away from the tape of the cassette. The laterally projecting lug 80 on the T-bar 77 has engaged a pin 82 on the righthand pressure roller mounting and raised the roller 24 away from its capstan 14. The recording and playback head (not shown) may be mounted directly on the T-bar 77 and move with the T-bar away from the tape.

In FIGS. 3-5, many components of the bidirectional transport shown in FIG. 1 have been omitted for purposes only of illustration, such that FIGS. 3-5 illustrate the capstan drive only for moving tape from left to right including the righthand capstan 14 and pinch roller 24. FIGS. 3-5 illustrate the fast rewind and fast forward pushbuttons 70, 71 and the connection from the pushbuttons to manually engage and disengage the righthand capstan drive and the reel drive for the take-up spindle.

In addition to disengaging the capstan drives as an incident to operation of either fast forward or fast rewind pushbutton 70 or 71, when the fast forward pushbutton 71 is actuated the motor 10 is connected to a power source providing a higher voltage raising the speed of the motor to fast speed. As previously indicated, when the fast rewind pushbutton 70 is operated, the direction of rotation of the motor is reversed and the motor speed is raised. In addition, in response to the fast rewind pushbutton the reel drive is shifted to operate the take-off reel as the take-up reel during the fast rewind operation.

During normal operation of the capstan drive and reel drives to drive the tape at playback or recording speed and deliver the tape to the take-up reel, it is conventional to operate the drive motor 10 at a constant speed, and to allow the adjustment of the angular speed of the take-up reel to be made by a slipping clutch.

When the tape is driven at fast speed in either the forward and rewind directions, however, it is undesirable to lose torque through a slipping clutch between the drive motor and the take-up reel. It has been known as illustrated in Bowman U.S. Pat. No. 3,529,787 to provide pawl means for locking that clutch when the tape transport is put into a fast wind mode.

According to the present invention, the reel drive means for the reel spindles 27 and 28 includes a slipping clutch 83 and associated with the clutch 83, means to short circuit the clutch components for providing a non-slipping direct connection. Referring to FIG. 6, the clutch 83 is mounted on the axis of the drive gear 29 which operates the intermediate gear 32. The intermediate gear is shiftable from engagement with the reel spindle gear 36 or 38. The clutch 83 includes a driving clutch plate 85 around the periphery of which extends the belt 31 of the pulley system 30 of the reel drive. The driving clutch plate 85 is, therefore, driven by the belt 31 and pulley system 30 from the flywheel 18. The clutch 83 also includes a driven clutch plate 87, friction means such as an annular piece of felt 89 between the two clutch plates, and a spring 91 mounted and arranged to urge the driving and driven clutch plates 85, 87 into engagement, so that torque is transmitted from the driving clutch plate 85 to the driven clutch plate 87 via the friction means 89. As shown in FIGS. 6-8, the driving clutch plate 85 bears at its lower end against a disc 92 fastened to a shaft 94 which mounts the assembly on the frame of the apparatus. The mounting is such that the driven clutch plate 87 may relatively freely turn about the axis of shaft 94 in response to torque applied to the driven clutch plate 87 from the driving clutch plate 85 via the frictional medium 89 between the clutch plates.

Further in carrying out the invention, in order to provie a direct connection between the clutch plates 85, 87 operable when the tape transport is placed in a fast wind mode, a short circuit gear 100 is provided engageable with a ring of outwardly facing gear teeth 96 on the driving clutch plate 85, and a similar outwardly facing ring of the same number of gear teeth 98 on the driven clutch plate 87. The separately mounted short circuit gear 100 when moved into mesh with the gear teeth 96, 86 on the driving and driven clutch plates 85, 87, spins freely about the central axis of the gear 100 as the clutch plates rotate and provide a direct connection between the clutch plates by eliminating any relative rotation between the clutch plates.

For operatively engaging and disengaging the short circuit gear 100 with the clutch components 85, 87, means is provided (see FIG. 3) which is manually operated as an incident to moving the pressure rollers 23, 24 toward and away from the capstans 12, 14 to engage and disengage the capstan drives. In carrying out the invention, the slidable T-bar 77 operated by the fast drive pushbuttons 70 or 71 to sequentially disengage the capstan drive and engage the fast drive in either the fast forward or rewind directions, is also utilized to engage and disengage the short circuit gear 100. A connection from the pushbutton 70, 71 to the gear 100 including the T-bar 77 is shown and is preferred, however, it is possible to provide a separate linkage to engage and disengage the short circuit gear 100.

It is an important feature of the invention to prevent jamming of the short circuit gear 100 with the gear teeth 96, 98 on the driving and driven clutch plates. For this purpose, the short circuit gear 100 is engaged sequentially with the teeth on the clutch plates. It is preferred that the short circuit gear 100 is engaged first with the teeth 96 on the driving clutch plate 85 and next with the teeth 98 on the driven clutch plate 87. Likewise, when disengaged, the short circuit gear 100 is disengaged in sequence, first from the teeth 98 on the driven clutch plate 87 and next with the teeth 96 on the driving clutch plate 85. This may be achieved as shown in FIG. 6 by having stepped teeth on short circuit gear 100, so that the larger diameter section 101 of the teeth on the gear 100 engage with the driving clutch plate teeth 96 first. Alternatively, as shown in FIGS. 7 and 8, the teeth 96 on the driving clutch plate may have a greater radius at the tip to be engaged first by the teeth of the short circuit gear 100.

It is a further important feature of the invention, to avoid tape breakage or spilling tape off the reels, that the mechanism provides, upon actuation of the fast drive in either direction, for disengaging the pressure roller from the capstan of the active capstan drive and thereafter engaging the short circuit gear 100. This feature precludes the possibility of the tape being capstan driven at play speed while the take-up reel is being directly driven at fast speed, without a clutch connection to at least momentarily slip and prevent tape breakage. To accomplish this, the short circuit gear 100 is carried on a link 102, as shown in FIGS. 3-5, pivotally mounted on a shaft 104 so as to move the short circuit gear 100 into and out of a meshing engagement with the teeth 96, 98 on the driving and driven clutch plates, under the control of the T-bar 77 which also operatively disengages and engages the capstan drive. For this purpose, a pin 106 on the T-bar 77 is engaged by a curved cam surface 108 on the link 102. As shown in the successive stop motion views, FIGS. 3-5, as the T-bar 77 is moved from the normal play speed position of FIG. 3 to an intermediate position shown in FIG. 4, in response to partial movement of either fast speed pushbutton 70 or 71, the pressure roller 24 is positively moved away from the capstan 14 before the pin 106 allows the link 102 to move gradually and smoothly counterclockwise and thereby move the short circuit gear 100 into engagement with the teeth 96, 98 on the clutch plates. As either pushbutton 70, 71 reaches its fully pressed in position, the pin 106 on the T-bar 77 is shifted beyond the end of the link 102 (as shown in FIG. 5), allowing the link 102 to pivot fully counterclockwise to the position shown in FIG. 5, and allow the short circuit gear 100, under the urging of the spring 110 which is connected to the arm 102, to mesh fully with the teeth on the driving and driven clutch plates. Similarly, when disengaging the fast drive by releasing either pushbutton 70 or 71, the T-bar 77 shifts forward to engage the pin 106 with the curved cam surface 108 on the link 102 and move the link 102 and the short circuit gear 100 out of engagement with the clutch plates 85, 87 before the T-bar allows the pressure roller 24 to engage its capstan 14.

I claim as my invention:

1. In a tape transport having a capstan drive for transfer of tape from a supply reel to a take-up reel, a reel drive for a take-up spindle for the take-up reel, and a slipping clutch in said reel drive, said clutch including rotating driving and driven clutch plates, and friction means between said clutch plates for transmitting torque from said driving to said driven clutch plates, the improvements in said tape transport comprising:

means providing a direct connection between said clutch plates, said direct connection means including gear teeth carried by said driving and said driven clutch plates forming separate gears, a short circuit gear, and means supporting said short circuit gear for movement into and out of engagement with said gears on both said clutch plates and for rotation about a fixed axis when engaged as said clutch plates rotate, to provide a non-slipping and selectively engageable direct connection between said clutch plates.

2. In a tape transport mechanism having a selectively engageable capstan drive for transfer of tape from a supply reel to a take-up reel including means for supporting a capstan drive element for movement into and out of driving engagement with the tape, a reel drive for a take-up spindle for the take-up reel, and a slipping clutch in said reel drive, said clutch including rotating driving and driven clutch plates, and friction means between said clutch plates for transmitting torque from one to the other, the improvements in said tape transport comprising:

means providing a selectively engageable direct drive connection between said clutch plates to provide a non-slipping connection in said reel drive for use in fast drive modes, said direct drive means including gear teeth on said driving and said driven clutch plates forming gears, a short circuit gear, means supporting said short circuit gear for movement into and out of engagement with said gears on both said clutch plates and for rotation about a fixed axis when engaged as said clutch plates rotate, and means cooperating with said supporting means for said short circuit gear and with said supporting means for said capstan drive element for engaging and disengaging said capstan drive and said direct non-slipping connection in said reel drive in sequence, said capstan drive being disengaged before said direct non-slipping connection in said reel drive is engaged, and said direct non-slipping connection in said reel drive being disengaged before said capstan drive is engaged, to prevent direct reel drive of the tape without disengagement of the capstan drive, and thereby avoid tape breakage or mechanism jamming.

3. In a tape transport, the improvements according to claim 1 wherein said short circuit gear is engaged sequentially with said separate gears, and rotated first by said driving clutch plate.

4. In a tape transport having a capstan drive for transfer of tape from a supply reel to a take-up reel, a reel drive for a take-up spindle for the take-up reel, a drive motor, drive means for connecting said motor to operate said capstan drive and said reel drive, and a slipping clutch in said drive means to said take-up spindle including a driving clutch plate coupled to said motor, a driven clutch plate coupled to said take-up spindle, friction means between said clutch plates, and means mounting said driving clutch plate for transmitting torque to said driven clutch plate via said friction means, the improvements in said tape transport comprising:

means providing a direct drive between said clutch plates, said direct drive means including gear teeth on said driving and said driven clutch plates forming separate gears, a short circuit gear, and means supporting said short circuit gear for movement into and out of engagement with said gears on both said clutch plates and for rotation about a fixed axis when engaged as said clutch plates rotate, to provide a non-slipping and selectively engageable direct connection between said clutch plates.

* * * * *

UNITED STATES PATENT AND TRADEMARK OFFICE
CERTIFICATE OF CORRECTION

PATENT NO. : 4,173,320

DATED : November 6, 1979

INVENTOR(S) : Etienne A. M. Schatteman

It is certified that error appears in the above—identified patent and that said Letters Patent is hereby corrected as shown below:

On the title page, after item [22] insert

-- October 17, 1977    Belgium    181811 --

Signed and Sealed this

Twenty-seventh Day of May 1980

[SEAL]

Attest:

SIDNEY A. DIAMOND

Attesting Officer    Commissioner of Patents and Trademarks

UNITED STATES PATENT OFFICE
CERTIFICATE OF CORRECTION

Patent No. 4,173,320      Dated November 6, 1979

Inventor(s) Etienne Arthur Marie Schatteman

It is certified that error appears in the above-identified patent and that said Letters Patent are hereby corrected as shown below:

On the title page, after item [22] insert --

[30]     Foreign Application Priority Data

October 17, 1977     Belgium     181,811 --

THIS CERTIFICATE SUPERSEDES CERTIFICATE OF CORRECTION ISSUED May 27, 1980.

Signed and Sealed this

Twenty-sixth Day of August 1980

[SEAL]

*Attest:*

SIDNEY A. DIAMOND

*Attesting Officer*     *Commissioner of Patents and Trademarks*